US005793849A

United States Patent [19]
Young et al.

[11] Patent Number: 5,793,849
[45] Date of Patent: Aug. 11, 1998

[54] TICKET TRANSMITTER

[76] Inventors: Lewis P. Young, 506 Huntington Rd., Greenville, S.C. 29615; Philip L. Reid, 400 S. Danzler Rd., Duncan, S.C. 29334

[21] Appl. No.: 534,875

[22] Filed: Sep. 27, 1995

Related U.S. Application Data

[63] Continuation of Ser. No. 104,719, Aug. 11, 1993, abandoned, which is a continuation-in-part of Ser. No. 902,457, Jun. 19, 1992, abandoned, which is a continuation of Ser. No. 730,107, Jul. 15, 1991, abandoned.

[51] Int. Cl.$^6$ .................................................. H04M 11/00
[52] U.S. Cl. ...................... 379/102.02; 379/93.12; 379/93.02; 379/93.09
[58] Field of Search .......................... 379/100, 102, 379/104, 105, 91, 95, 94, 93, 93.12, 93.02, 91.01, 91.02, 93.09, 93.26, 100.01, 100.15, 100.16, 102.01, 102.02; 364/408, 407, 401

[56] References Cited

U.S. PATENT DOCUMENTS

| | | |
|---|---|---|
| 3,351,005 | 11/1967 | Giori ........................................ 101/77 |
| 4,381,705 | 5/1983 | Roes et al. . |
| 4,788,714 | 11/1988 | Hashimoto ............................... 379/100 |
| 4,821,312 | 4/1989 | Horton et al. ........................... 379/102 |
| 4,825,465 | 4/1989 | Ryan ....................................... 379/100 |
| 4,895,466 | 1/1990 | Hartman et al. ...................... 400/613.2 |
| 5,056,132 | 10/1991 | Coleman et al. ........................ 379/88 |
| 5,235,676 | 8/1993 | Clay et al. ............................... 398/113 |
| 5,237,499 | 8/1993 | Gauback ................................. 364/407 |

*Primary Examiner*—Stella Woo
*Attorney, Agent, or Firm*—Hardaway Law Firm P.A.

[57] ABSTRACT

The transmission of ticket coupons, particularly airline ticket coupons, to remote locations quickly through the use of a printing apparatus, a switching apparatus and other signal receiving apparatus to eliminate the need for hand delivery or mailing by a travel agency and without the use of a dedicated line. This process thus enhances the services provided by a travel agency.

10 Claims, 3 Drawing Sheets

TICKET TRANSMITTER

This application is a file wrapper continuation, of application Ser. No. 08/104,719, filed Aug. 11, 1993, now abandoned, which is a continuation-in-part of application Ser. No. 07/902,457, filed Jun. 19, 1992, now abandoned which is a continuation of Ser. No. 07/730,107, filed Jul. 15, 1991, now abandoned.

BACKGROUND OF THE INVENTION

This invention relates generally to the art of printing and more particularly to the art of transmitting tickets to remote locations.

In the practice of a travel agency an airline ticket is printed through a process very strictly governed by the Airline Reporting Corporation (ARC). The ARC governs the licensing and bonding of ticket issuers (reservation systems) for airlines and all procedures associated with same.

A typical airline ticket is originated by a customer telephoning a travel agency and advising the travel agency of a trip and details. The travel agency then through its computer terminals communicates with the reservation system to provide details of the client itinerary as well as the identifying codes of the travel agency. The reservation system upon receiving the Passenger Name Record (PNR), trip itinerary and travel agency details, then authorizes through electronic media the printing of a ticket at the agency location via mainframe computer communication to the travel agency computer modem connection to authorize the printing of a ticket on ticket stock at the agency location. The agency is simultaneously billed by the reservation system.

The travel agency maintains an inventory of ticket stock which is pre-numbered and closely accounted for because of the inherent value of the ticket stock. It is largely for this reason that such industry is so closely regulated.

Upon printing of a ticket, the travel agent then either mails or hand carries the ticket to the client, and, in the event the client has not paid for the ticket at the time of its printing, simultaneously bills the client for the ticket. Frequently such clients are large businesses where many such tickets are delivered on a daily basis.

In the event of travel agency clients having extremely large volumes of business, a dedicated printer is maintained at the client location whereby upon authorization by the travel agency to the reservation system such dedicated printing apparatus is activated in the same way that the printer in the travel agent's office is activated. The vast majority, however, of travel agency clients are not of sufficient size to justify the expenses associated with a dedicated line and printer.

For purposes of illustration, ticket printers are described in U.S. Pat. No. 4,381,705 to Rose, et al. and U.S. Pat. No. 3,351,052 Giori.

While the procedures and apparatus described above have functioned well in the travel industry, a need exists to enhance the services provided by travel agents.

SUMMARY OF THE INVENTION

It is thus an object of this invention to enhance the services provided by a travel agency.

It is a further object of this invention to make possible the printing of tickets at remote locations upon authorization by an agent without the necessity of a dedicated line to a reservation system.

It is a more particular object of this invention to provide for airline ticket printing at remote locations to eliminate the need for hand delivery or mailing by a travel agency.

These as well as other objects are accomplished by utilizing a normal facsimile or phone line at a remote client location and providing on such normal facsimile or phone line a switching apparatus having separate communication with a desired facsimile apparatus and a printing apparatus. The switching apparatus has the ability to receive incoming telephone lines signals and discern from such signals whether to access a printing apparatus for the printing of tickets or the facsimile apparatus. The process is thus carried out by generating a first signal to access the appropriate telephone line at the remote location, receiving the first signal at the remote location, generating a second signal directing the switching apparatus to connect with the printing apparatus and generating a third signal to control the printing apparatus to print a ticket coupon having the appropriate information thereon in accordance with the third signal.

DETAILED DESCRIPTION

In accordance with this invention it has been found that passenger tickets may be generated at remote locations so as to eliminate the need for hand delivery or mailing of such tickets. This is accomplished without the use of a dedicated line to a ticket printer and utilizes the normal facsimile line at the remote location. A switching apparatus is provided with this invention to discern whether to direct an incoming call to a signal receiving apparatus such as a facsimile machine or to a ticket printer in accordance with this invention. Further, the advantages and features will become apparent from a reading of the following description given with reference to the various figures of drawing.

Figure 1:
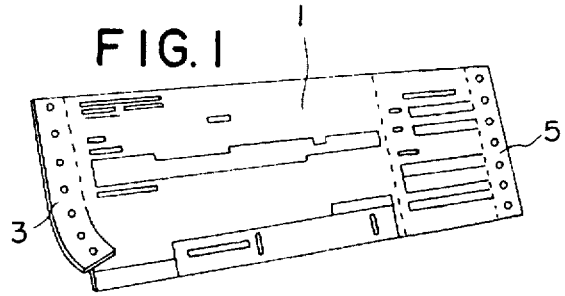
FIG. 1 of the drawings illustrates in a perspective view standard ticket stock.

FIG. 1 of the drawings illustrates a section of ticket stock 1 having tractor feed edges 3 and 5 thereon for feeding through a ticket printing apparatus which will be further described.

Figure 2:
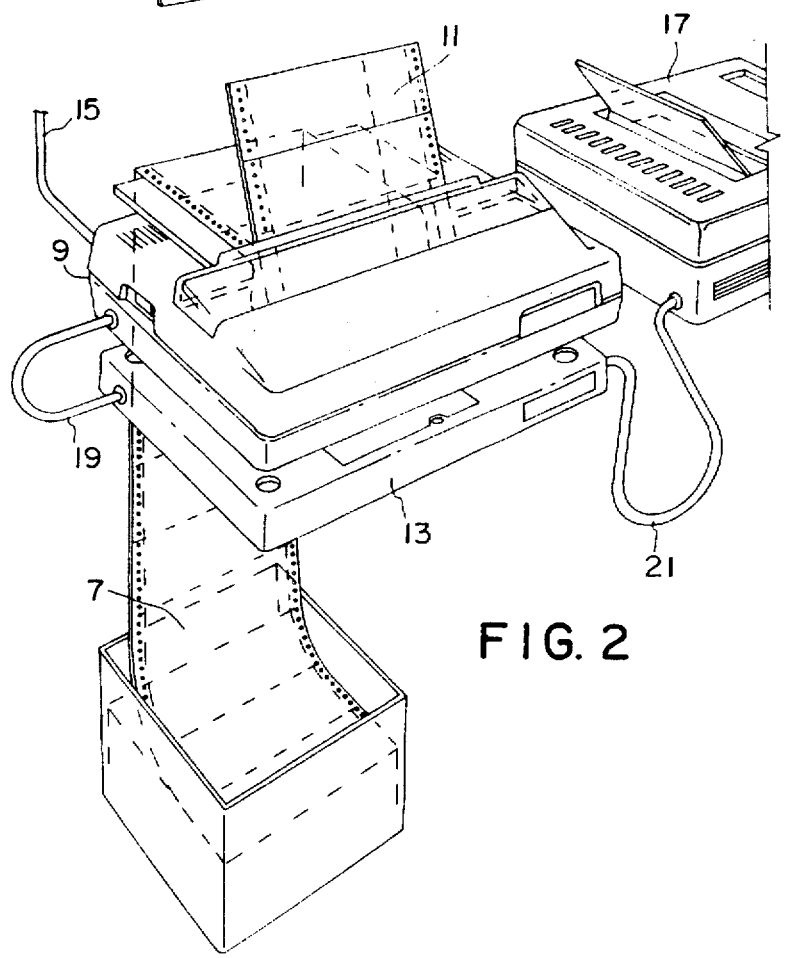
FIG. 2 of the drawings is a perspective view illustrating the apparatus of this invention.

FIG. 2 of the drawings illustrates an inventory 7 of ticket stock being fed into printer 9 for the printing of individual tickets such as 11 thereon.

Conventional printers such as 9 operate through a programmed modem which operates through secure language from the reservation system to print only when authorized information is transmitted into the modem. In accordance with invention it has been found that a printer such as 9 may be maintained at remote locations without the need for dedicated telephone lines.

Thus, in accordance with this invention, a switching apparatus 13 is provided which receives an incoming telephone signal through line 15. Upon receipt of the signal, switching apparatus 13 discerns whether to direct the connection to printer 9 or facsimile apparatus 17. Switching apparatus is connected to printer 9 through connection 19 and to facsimile apparatus 17 through connection 21. A switch apparatus known in the art as a king switch is useful for use with this invention. An example of such is sold under the trademark "Selectone."

Switching apparatus 13 in accordance with this invention once installed may be of a multiplex configuration so as to not only direct electronic communications to fax machines or ticket printers, but also other travel related information such as cruise documents, tour documents, etc. depending on the appropriate signal upon receipt of an initial signal.

Figure 3:
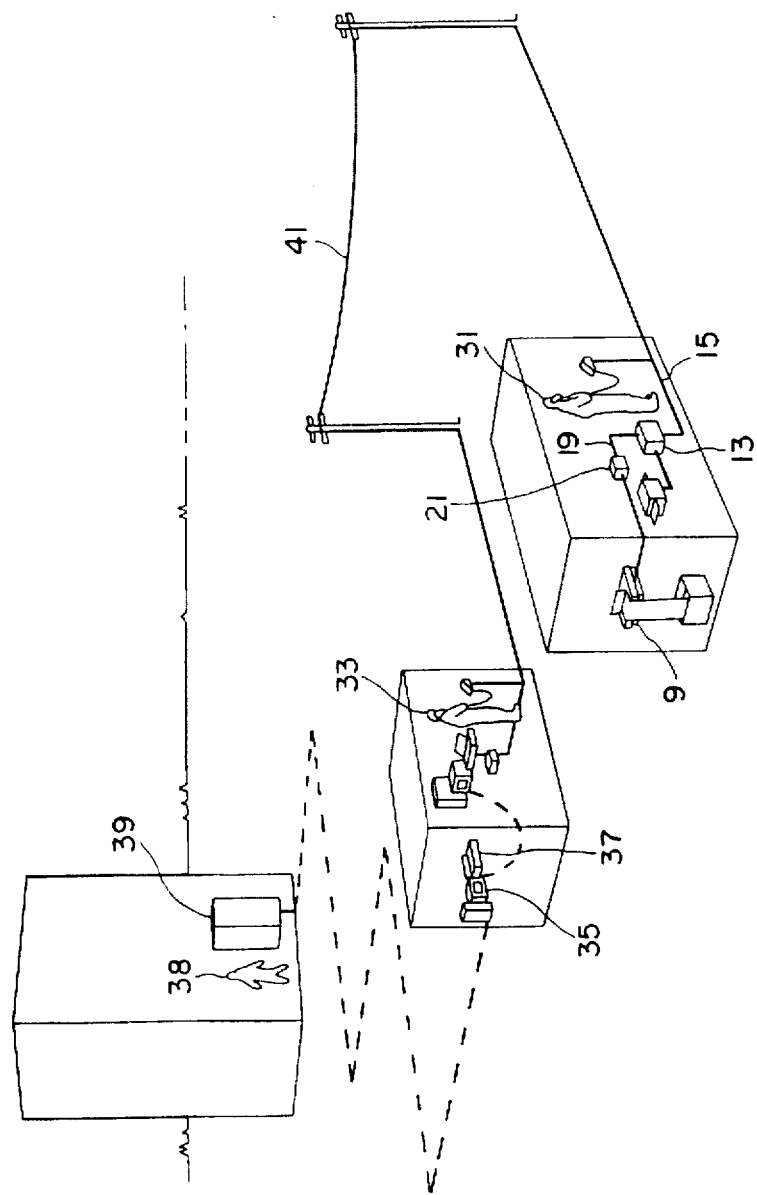
FIG. 3 of the drawings illustrates in schematic form the process of this invention in one embodiment.

For purposes of illustration two forms of operation will now be described. Referring to FIG. 3 a form of operation will be described whereby the travel agent instructs the printing of a ticket at a client location. FIG. 3 illustrates a customer 31 contacting by telephone a travel agent 33 to provide the travel agent 33 with itinerary information.

Agent 33 then via computer 35 contacts a reservation system represented by individual 38 who through transmission of secure information via mainframe 39 authorizes the printing of a ticket at the location of agent 33. Authorization transmitted by the mainframe 39 may consist of a code, such as a numeric code, known only to the individual 38. Alternatively, the code may be programmed into the mainframe 39. Only upon this authorization from the reservation system, the agent's computer terminal 35 causes ticket information to be printed by printer 37.

Agent 33 then takes the information provided on the thus obtained ticket and digitizes it through known techniques for transmission through telephone line 41 to the location of the client 31. Transmission involves generating a first signal for receipt by switching apparatus 13 at client location 31. The first signal is discerned through generation of a second signal by the mainframe 39 to be for a ticket printer and is thus directed through line 19, where modem 21 is separately illustrated. Modem 21 then transforms the authorized ticket information, sent by the mainframe 39 in the form of a third signal, into printing instructions for printer 9, which thus prints an appropriate ticket at the client location 31. The agent 33 maintains a record of the transaction and thus bills the client in the normal course of business as well as being appropriately billed through the mainframe 39.

If desired in a particular instance, the ticket transmitting system of the present invention may include means (not shown) for enabling a client to bypass the travel agent 33 and communicate directly with individual 38, as is conventionally done with dedicated lines for clients having large volumes of business.

Figure 4:
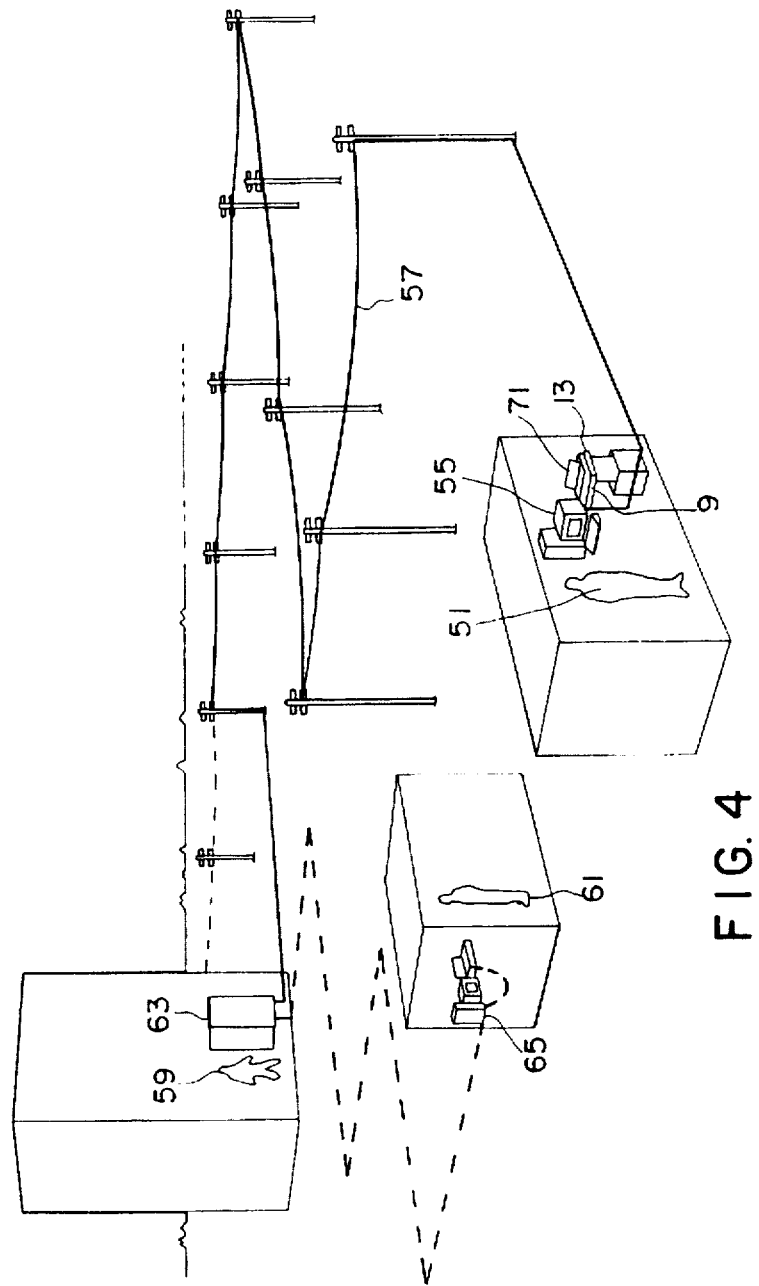
FIG. 4 of the drawings illustrates in schematic form the process of this invention in another form.

An additional mode of operation is illustrated in FIG. 4 of the drawings where a customer 51 initiates a ticket order through computer terminal 55. The ticket order is carried electronically through telephone lines 57 directly to mainframe 63 at the location of the reservation system represented by individual 59. The information is also provided to the travel agent 61 who authorizes the transaction and receives information of such via mainframe computer 63 in communication with the travel agent's terminal 65. Only upon authorization by agent 61 does mainframe 63 initiate a first signal through lines 57 which, upon receipt within switching apparatus 13, generates a second signal directing connection to ticket printer 9, whereupon a third signal is initiated for decoding within a modem contained within printer 9 for the printing of a ticket at 71.

It is thus seen that the apparatus of this invention provides a novel improved method of conducting a travel agency. Additionally it is seen that the invention provides a method of ticket generation at remote locations which eliminates the need for hand delivery thereof. As various other advantages and features will become apparent to those of skill in the art through a reading of the foregoing description which exemplary in nature such modification are embodied within the spirit and scope of this invention as defined by the following appended claims.

That which is claimed:

1. A process for generating a ticket coupon at a remote location comprising the steps of:

generating a ticket coupon request at said remote location and informing a first location of said request;

said first location contacting a second location with said ticket coupon request information;

generating an initiating signal at said second location authorizing the printing of a ticket by a printing apparatus at said first location;

generating a first signal at said first location to access a telephone line at said remote location;

receiving said first signal at said remote location, said remote location having a printing apparatus and other signal receiving apparatus associated with a switching apparatus;

generating a second signal at said first location directing said switching apparatus to connect with said printing apparatus; and generating at said first location a third signal to control said printing apparatus to print said ticket coupon at said remote location in accordance with said third signal;

wherein said first location comprises a travel agency and said second location comprises a reservation system.

2. The process according to claim 1 wherein said other signal receiving apparatus is a facsimile apparatus.

3. The process according to claim 1, wherein said third signal includes secure information authorized only by said first location.

4. A process for generating a ticket coupon at a remote location comprising the steps of:

generating a ticket coupon request at said remote location and informing a first location of said request;

also informing a second location of said request;

generating an initiating signal at said second location providing authorization for the generation of a ticket coupon to said first location;

generating a first signal at said first location to access a telephone line at said remote location;

receiving said first signal at said remote location, said remote location having a printing apparatus and other signal receiving apparatus associated with a switching apparatus;

generating a second signal at said first location directing said switching apparatus to connect with said printing apparatus; and generating a third signal at said first location to control said printing apparatus to print said ticket coupon at said remote station in accordance with said third signal;

wherein said first location comprises a reservation system and said second location comprises a travel agency.

5. The process according to claim 4, wherein said third signal includes secure information authorized only by said second location.

6. A remote apparatus for receiving generated signals and printing specific ticket coupons therefrom comprising:

a printing apparatus;

other signal receiving apparatus; and a switching apparatus having separate communication with said other signal receiving apparatus and said printing apparatus;

said switching apparatus receiving incoming telephone line signals and discerning from an incoming signal whether to access said printing apparatus or said other signal receiving apparatus;

wherein ticket request information has passed through a travel agency and a reservation system before said switching apparatus accesses said printing apparatus;

said printing apparatus printing a ticket coupon from information transmitted via another signal upon authorization from an origin of said incoming signal that is sent in response to a request from said remote apparatus to print a specific ticket coupon.

7. The apparatus according to claim 6 wherein said other signal receiving apparatus is a facsimile apparatus.

8. The apparatus according to claim 6 wherein said switching apparatus also has the ability to generate a second signal directing connection to said ticket printer.

9. The apparatus according to claim 6, wherein said incoming signal originates from a travel agency.

10. The apparatus according to claim 6, wherein said incoming signal originates from a reservation system.

* * * * *